Dec. 20, 1955   M. L. BENJAMIN ET AL   2,727,748
QUICK-CHANGE CHUCK
Filed Nov. 15, 1954
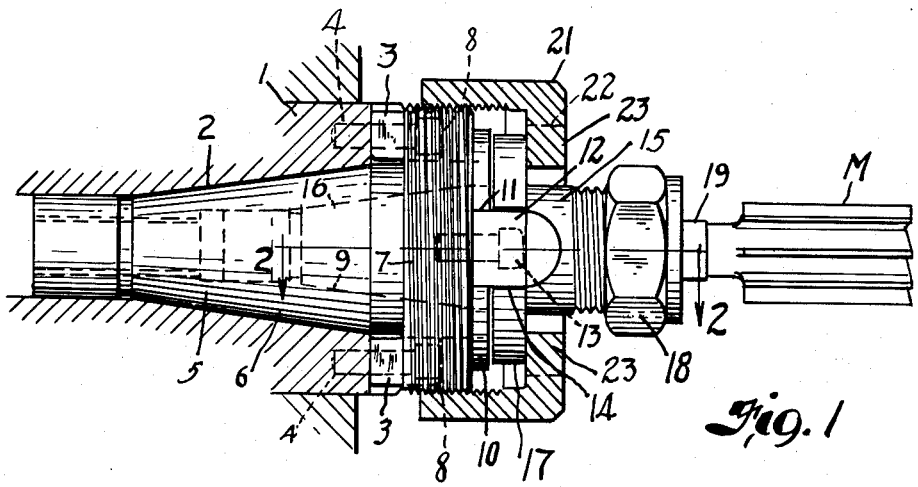
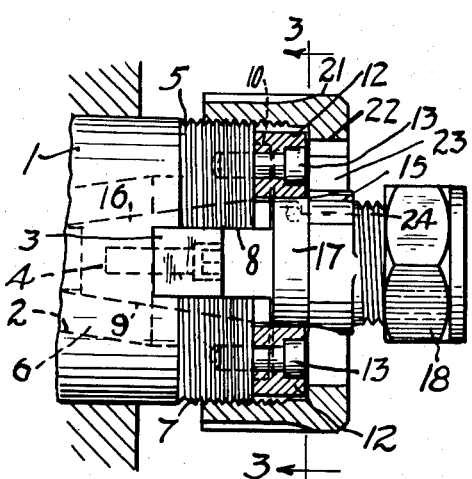
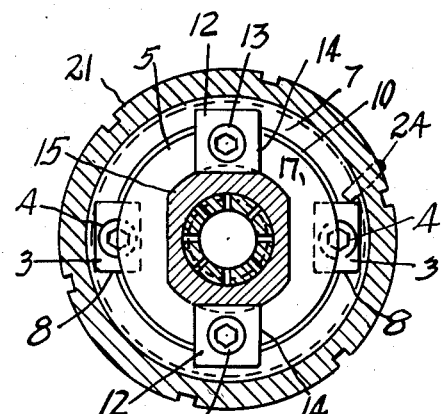
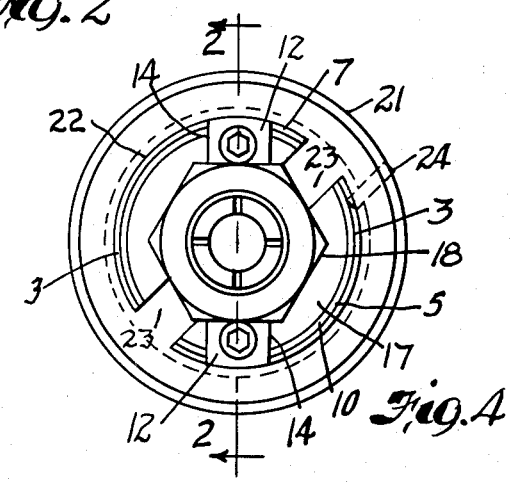
INVENTORS
MILTON L. BENJAMIN AND
BY STANLEY S. BENJAMIN
Oberlin & Limbach
ATTORNEYS.

United States Patent Office 2,727,748
Patented Dec. 20, 1955

2,727,748
QUICK-CHANGE CHUCK

Milton L. Benjamin and Stanley S. Benjamin, Cleveland, Ohio, assignors to Erickson Tool Company, a corporation of Ohio Application November 15, 1954, Serial No. 468,658

2 Claims. (Cl. 279—102)

The present invention relates generally as indicated to a quick-change chuck and more particularly to a chuck in which the tool mounting members may be changed within a matter of a few seconds simply by turning a clamping nut a part turn only and axially withdrawing and inserting said members.

Accordingly, it is an object of this invention to provide such a quick-change chuck which securely and accurately mounts the tool mounting member in coaxial and non-rotatable relation with respect to the spindle of a metal-working machine such as, for example, a milling machine.

Another object of this invention is to provide such a quick-change chuck in which the non-rotatable keying elements are disposed relatively far from the axis of the tool mounting member so as to reduce the torque stresses thereon and to insure strong resistance against relative rotation while maintaining the stresses on the complementary keying elements at values precluding deformation thereof.

It is another object of this invention to provide a quick-change chuck in which the tool mounting member is of conventional form including a tapered shank terminating in a collar or flange which is radially slotted for engagement with corresponding keys or blocks of the spindle adaptor or arbor on the machine spindle.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawing:

Fig. 1 is an elevation view, partly in cross-section, of one embodiment of the present invention;

Fig. 2 is a cross-section view taken substantially along the line 2—2, Figs. 1 and 4;

Fig. 3 is a transverse cross-section view taken substantially along the line 3—3, Fig. 2; and Fig. 4 is an end elevation view as viewed from the righthand end of Fig. 2.

Referring now more particularly to the drawing, the reference numeral 1 therein designates the spindle as of a milling machine or the like formed with a self-releasing tapered bore 2 and being diametrically slotted at its nose end to receive therein, in axially projecting diametrically opposite relation, a pair of keys or blocks 3 which are held in place as by means of screws 4.

The spindle arbor or adaptor 5 has a tapered shank 6 which extends into and engages the tapered bore 2. Said adaptor 5 is formed with a threaded collar portion 7 which is formed with a pair of diametrically opposite radially extending slots 8 which fit over the opposite parallel faces of the keys 3 and thus, when said adaptor 5 is inserted into the end of the spindle 1 with slots 8 registering with the keys 3, it is accurately held in a coaxial position with respect to the spindle and is positively driven thereby through the complementary key means 3 and 8.

The end of the adaptor 5 has a tapered bore 9 therein, and surrounding said bore is an annular reduced diameter portion 10 which is diametrically slotted as at 11 to receive therewithin keys or blocks 12 which are held in place by screws 13 and which project axially beyond said annular portion 10.

The tool mounting member 15 has a shank 16 tapered to fit in the tapered bore 9 and adjacent the large end of said shank is a collar or flange 17 having its inner face spaced from the outer end face of the adaptor 5 and its outer face in a plane approximately flush with or outward beyond the outer end faces of the keys 12 for a purpose which will be presently described in detail.

Axially beyond the collar or flange 17 which is radially slotted as at 14 to fit over the keys 12, said tool mounting member 15 may be integrally formed as a metal working tool, but the usual practice is to employ a collet chuck structure which may be of any conventional form or of a form such as is shown in my prior Patent No. 2,358,300, dated September 19, 1944, in which a nose piece 18 has threaded engagement with the end of the tool mounting member 15 for contracting a slotted collet into tight frictional gripping engagement with the shank 19 of a milling cutter M, reamer, drill or other tool.

The tapered bore 9 and the tapered shank 16 are preferably of self-releasing taper.

Threadedly engaged with the adaptor 5 is a sleeve-type clamping nut 21 which has a bore 22 at least as large as the diameter of the flange 17 and has a pair of diametrically opposed inwardly extending lugs 23 which, when aligned with the keys 12, permit the tool mounting member 15 to be axially withdrawn with respect to the adaptor 5 and spindle 1. Another tool mounting member 15 may be readily mounted simply by inserting the same axially with its tapered shank 16 fitting into the tapered bore 9 and the slots 14 thereof fitted over the keys 12. With the tool mounting member 15 thus inserted, the inner faces of the lugs 23 will press upon the outer end face of the flange 17 as the nut 21 is rotated, whereupon the tool mounting member 15 is securely clamped in place.

The nut 21 is provided with a stop pin 24 which is adapted to engage one side of one of the keys 12 to limit rotation of the nut in the releasing direction so that the lugs 23 will be aligned with the keys 12.

In actual practice, it has been found that only about 45° rotation is required of the nut 21 in order to firmly clamp the tool mounting member 15 in the adaptor 5.

The chuck herein disclosed may be readily disassembled. All that it is necessary to do after the tool mounting member 15 has been withdrawn is to slightly rotate the nut 21 in the clamping direction to provide access to the screws 13 so that the keys 12 may be removed. Having removed the keys 12, the nut 21 may be freely rotated and removed from the adaptor 5. In reassembling the chuck, the tool mounting member 15 is first inserted without the keys 12 in place, and then the clamping nut 21 is threaded on to the adaptor and rotated until the lugs 23 firmly engage the outer end surface of the flange 17. The clamping nut 21 is then backed off a part turn until the lugs 23 are aligned with the slots 14 of the tool mounting member 15, whereupon the latter may then be withdrawn.

The clamping nut 21 is then turned in the tightening direction so that the keys 12 may be secured in place by screws 13.

Other modes of applying the principle of the invention may be employed, change being made as regards the details described, provided the features stated in any of the following claims, or the equivalent of such, be employed.

We therefore particularly point out and distinctly claim as our invention:

1. A quick-change chuck comprising an adaptor formed with a tapered socket at one end and having a pair of diametrically opposite keys detachably secured thereto in axially projecting relation from such one end, a tool mounting member having a tapered shank fitted within such socket and an adjacent radially extending flange slotted to fit over the axially projecting portions of said keys and thus to hold said adaptor and member against relative rotation, a ring-like nut threaded on said adaptor and having diametrically opposed radially inwardly extending lugs which in two different rotary positions of said nut respectively are aligned with said keys and the slots of said flange whereby said member may be axially withdrawn from said adaptor and bear against said flange to thereby lock said member against such axial withdrawal, and positive stop means carried by said nut for engagement with one of said keys when said nut is rotated from the second to the first-mentioned rotary position.

2. The chuck of claim 1 wherein the face of said flange which is engaged by said lugs is approximately flush with the ends of said keys whereby locking of said member is effected by only a part-turn rotation of said nut from the first to the second-mentioned rotary position.

References Cited in the file of this patent

UNITED STATES PATENTS 2,579,082     Kramer  ---------------- Dec. 18, 1951